United States Patent
Kowalevicz et al.

(10) Patent No.: US 10,177,856 B2
(45) Date of Patent: Jan. 8, 2019

(54) SYSTEMS AND METHODS FOR DEMODULATION OF PHASE MODULATED OPTICAL SIGNALS

(71) Applicant: RAYTHEON COMPANY, Waltham, MA (US)

(72) Inventors: Andrew Kowalevicz, Arlington, VA (US); Benjamin P. Dolgin, Alexandria, VA (US); Gary M. Graceffo, Burke, VA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 15/679,470

(22) Filed: Aug. 17, 2017

(65) Prior Publication Data
US 2018/0054259 A1  Feb. 22, 2018

Related U.S. Application Data

(60) Provisional application No. 62/376,461, filed on Aug. 18, 2016.

(51) Int. Cl.
*H04B 10/00* (2013.01)
*H04B 10/67* (2013.01)
(Continued)

(52) U.S. Cl.
CPC ........... *H04B 10/676* (2013.01); *H04B 10/25* (2013.01); *H04B 10/5561* (2013.01);
(Continued)

(58) Field of Classification Search
CPC ...... G02B 6/12007; G02B 6/122; G02B 6/10; G02B 6/29338; H01S 5/02284;
(Continued)

(56) References Cited

U.S. PATENT DOCUMENTS 8,411,351 B2   4/2013   McCallion et al.
2006/0013591 A1   1/2006   Rohde
(Continued)

FOREIGN PATENT DOCUMENTS

JP          H0591047 A       4/1993

OTHER PUBLICATIONS

Zhang, L. et al. "Microring-based Modulation and Demodulation of DPSK Signal" Optical Society of America, Optics Express, vol. 15, No. 18, Sep. 3, 2007.
(Continued)

*Primary Examiner* — Don N Vo
(74) *Attorney, Agent, or Firm* — Lando & Anastasi, LLP

(57) ABSTRACT

Optical signal receivers and methods are provided that include an optical resonator that allows optical signal energy to enter and accumulate inside the optical resonator. A portion of optical signal energy is emitted from the optical resonator at an output, such that the emitted optical signal energy is disturbed when a transition occurs in the received optical signal energy. A detector aligned with the output detects the emitted optical signal energy and is configured to detect the disturbance to the emitted optical signal energy and determine a characteristic of the transition in the received optical signal energy based upon the disturbance.

18 Claims, 11 Drawing Sheets

(51) Int. Cl.
*H04B 10/69* (2013.01)
*H04B 10/25* (2013.01)
*H04B 10/61* (2013.01)
*H04B 10/556* (2013.01)

(52) U.S. Cl.
CPC .............. *H04B 10/61* (2013.01); *H04B 10/67* (2013.01); *H04B 10/69* (2013.01)

(58) Field of Classification Search
CPC ...... H04B 10/63; H04B 10/676; H04B 10/67; H04B 10/5561; H04B 10/61; H04B 10/69; H04B 10/25; G02F 3/00; G02F 1/011; H03K 3/42; H03K 17/78; H03K 19/14; H04L 7/0075
USPC ........................................................ 398/211
See application file for complete search history.

(56) References Cited

U.S. PATENT DOCUMENTS

| | | |
|---|---|---|
| 2007/0031150 A1 | 2/2007 | Fisher et al. |
| 2008/0226300 A1 | 9/2008 | Mayer et al. |
| 2008/0240736 A1 | 10/2008 | Ji et al. |
| 2008/0266573 A1* | 10/2008 | Choi .................. G01N 21/7746 356/481 |
| 2011/0097085 A1 | 4/2011 | Oda et al. |
| 2012/0121271 A1 | 5/2012 | Wood |
| 2013/0272337 A1* | 10/2013 | Tan .................... H01S 5/02284 372/107 |
| 2014/0314406 A1 | 10/2014 | Zerbe et al. |
| 2016/0013870 A1* | 1/2016 | Sorin .................. G02B 6/4208 398/208 |
| 2018/0091227 A1 | 3/2018 | Dolgin et al. |
| 2018/0091228 A1 | 3/2018 | Kowalevicz et al. |
| 2018/0091230 A1 | 3/2018 | Dolgin et al. |
| 2018/0091232 A1 | 3/2018 | Dolgin et al. |

OTHER PUBLICATIONS

Arimoto et al., "High-speed free-space laser communication", Performance and Management of Complex Communications Networks, 1998, pp. 175-190.

Wright et al., "Adaptive optics correction into single mode fiber for a low Earth orbiting space to ground optical communication link using the OPALs downlink", Optics Express, vol. 23, Dec. 2015, pp. 1-8.

Andrews et al., "Final Report: Channel Characterization for Free-Space Optical Communications, Phase 0 testing at Hollister, CA, Phase 2 Final Testing at China Lake, CA", Jul. 2012, pp. 1-60. Retrieved from <URL: http://www.dtic.mil/cgi-bin/GetTRDoc?Location=U2&doc=GetTRDoc.pdf&AD=ADA565323> and accessed on Nov. 17, 2017.

Juarez et al., "High-sensitivity DPSK receiver for high-bandwidth free-space optical communication links", Optics Express, vol. 19, May 2011, pp. 1-8.

International Search Report and Written Opinion for application No. PCT/US2017/053667 dated Dec. 15, 2017.

Fang et al., "Multi-channel Silicon Photonic Receiver Based on Ring-resonators", Optics Express, vol. 18, No. 13, pp. 13510-13515, Jun. 21, 2010.

Xu et al., "Optical Differential-Phase-Shift-Keying Demodulation Using a Silicon Microring Resonator", IEEE Photonics Technology Letters, vol. 21, pp. 295-297, No. 5, Mar. 1, 2009.

* cited by examiner

SYSTEMS AND METHODS FOR DEMODULATION OF PHASE MODULATED OPTICAL SIGNALS

BACKGROUND

Optical signals with phase modulation formats have several advantages over amplitude modulation formats. However, when compared to typical amplitude modulation receivers, phase modulation receivers can be significantly more complex. Some examples of phase modulation receivers may include local oscillators, Fiber Bragg Gratings (FBG), and delay line interferometers (DLI). Generally, a phase modulation receiver collects a phase-encoded optical signal and performs one or more demodulation processes to convert the phase modulation into useful information, such as communications information encoded in the phase modulation by, e.g., a transmitter, or other information encoded in the phase modulation, such as through interaction of the optical signal with an object, or other information about the source of the optical signal, the optical channel through which it traveled, and/or objects with which it interacted.

SUMMARY

Aspects and examples described herein provide systems and methods for demodulation of optical signals without the necessity for a locally coherent clock source. In particular, certain examples of the system include a receiver having an optical resonator, such as a Fabry-Perot filter/resonator, for converting a received phase-encoded optical signal into an intensity-encoded optical signal. When compared to various known receivers, the Fabry-Perot significantly reduces the size, weight, complexity, and cost of the system. Moreover, the Fabry-Perot may be tuned to the wavelength of an optical carrier signal and therefore function over a broad range of modulation rates without the need to modify the characteristics of the receiver. That is, the systems and methods disclosed herein may provide the flexibility to accommodate various encoding techniques.

According to one aspect, an optical signal receiver is provided that includes an optical resonator having an aperture to allow optical signal energy to enter and an output to allow a portion of optical signal energy to be emitted, the optical resonator configured to receive optical signal energy via the aperture, accumulate resonant optical signal energy inside the optical resonator, cause the emitted optical signal energy to approach a steady-state output value, and disturb the emitted optical signal energy upon a transition in the received optical signal energy, the optical resonator having at least one dimension to cause phase alignment of the accumulated optical signal energy at one or more resonant wavelengths, and a detector aligned with the output to detect the emitted optical signal energy and configured to detect the disturbance to the emitted optical signal energy and determine a characteristic of the transition in the received optical signal energy based upon the disturbance.

In some embodiments, the optical resonator is further configured to disturb the emitted optical output signal based upon a phase variation in the received optical signal energy.

In some embodiments, the disturbance is a temporary reduction in intensity of the emitted optical signal energy and the detector is further configured to detect the temporary reduction and to determine a phase transition in the received optical signal energy based upon the temporary reduction.

In certain embodiments, the optical resonator is an etalon having two semi-reflective surfaces configured to at least partially trap the optical signal energy by reflecting a portion of optical signal energy impinging upon each of the semi-reflective surfaces.

In some embodiments, the optical resonator includes first and second reflective surfaces, substantially parallel with each other, with reflective sides facing each other, the first reflective surface forming at least a portion of the aperture and being partially transmissive to optical signal energy arriving from outside the optical resonator to allow optical signal energy into the optical resonator, the second reflective surface forming at least a portion of the output and being substantially reflective but partially transmissive to optical signal energy inside the optical resonator to allow the portion of the optical signal energy inside the optical resonator to be emitted outside the optical resonator.

In certain embodiments, the transition in the received optical signal energy may be an edge of a pulse and the detector is configured to determine a pulse width based upon the disturbance to the emitted optical signal energy.

In certain embodiments, the optical signal receiver includes an optical-electrical converter configured to convert the emitted optical signal energy into an electrical signal, the electrical signal having an amplitude indicative of an intensity of the emitted optical signal energy, and the detector configured to detect the disturbance to the emitted optical signal energy by processing the electrical signal.

According to another aspect, a method of detecting information encoded in an optical signal is provided. The method includes receiving optical signal energy, accumulating the optical signal energy in an optical resonator that approaches a steady state of accumulated optical signal energy, outputting optical signal energy from the accumulated optical signal energy, the intensity of the output optical signal energy proportional to the accumulated optical signal energy, detecting the output optical signal energy, and determining a modulation characteristic of the received optical signal energy based on the detected output optical signal energy.

According to some embodiments, determining a modulation characteristic of the received optical signal energy based on the detected output signal energy includes determining a phase variation in the received optical signal energy based on an intensity variation in the output optical signal energy.

Certain embodiments also include reducing the accumulated optical signal energy in the optical resonator by destructive interference within the optical resonator in response to the modulation characteristic of the received optical signal energy. In some embodiments, the modulation characteristic in the received optical signal energy is a phase transition associated with a phase modulation produced at a transmitter.

In some embodiments, accumulating the optical signal energy in an optical resonator includes partially reflecting the optical signal energy between two semi-reflective surfaces.

Some embodiments also include converting the output optical signal energy into an electrical signal, the amplitude of the electrical signal being representative of the intensity of the output optical signal energy. The electrical signal may be provided to a receiver to determine the modulation characteristic of the received optical signal energy.

According to yet another aspect, an optical receiver includes an etalon, an optical-electrical converter, and a receiver. The etalon is configured to at least partially accumulate optical signal energy between two semi-reflective surfaces and having an aperture to allow optical signal energy to enter and an output to allow a portion of the accumulated optical signal energy to be emitted, the etalon configured to cause the output optical signal energy to temporarily vary in intensity based upon a phase transition in the entering optical signal energy. The optical-electrical converter is configured to receive the output optical signal energy and to convert the output optical signal energy into an electrical signal, and the receiver is configured to receive the electrical signal and to determine data based in part on the electrical signal.

Some embodiments also include an analog to digital converter configured to convert the electrical signal from an analog form to a digital form, the receiver configured to receive the digital form of the electrical signal.

In certain embodiments, the receiver is configured to correlate the electrical signal with at least one of a spreading code, a pseudo-random code, a block code, and a convolution code.

In some embodiments, the etalon is configured to have a nominal dimension selected to cause the etalon to at least partially accumulate optical signal energy of a particular wavelength.

In certain embodiments, the etalon is configured to have a nominal dimension selected to cause the accumulation of optical signal energy to occur at a particular rate to accommodate an expected data rate associated with the data.

Certain embodiments also include optics configured to collect optical signal energy and provide the optical signal energy to the etalon.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and embodiments described herein may include means for performing any of the described methods or functions.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures.

DETAILED DESCRIPTION

Figure 1:
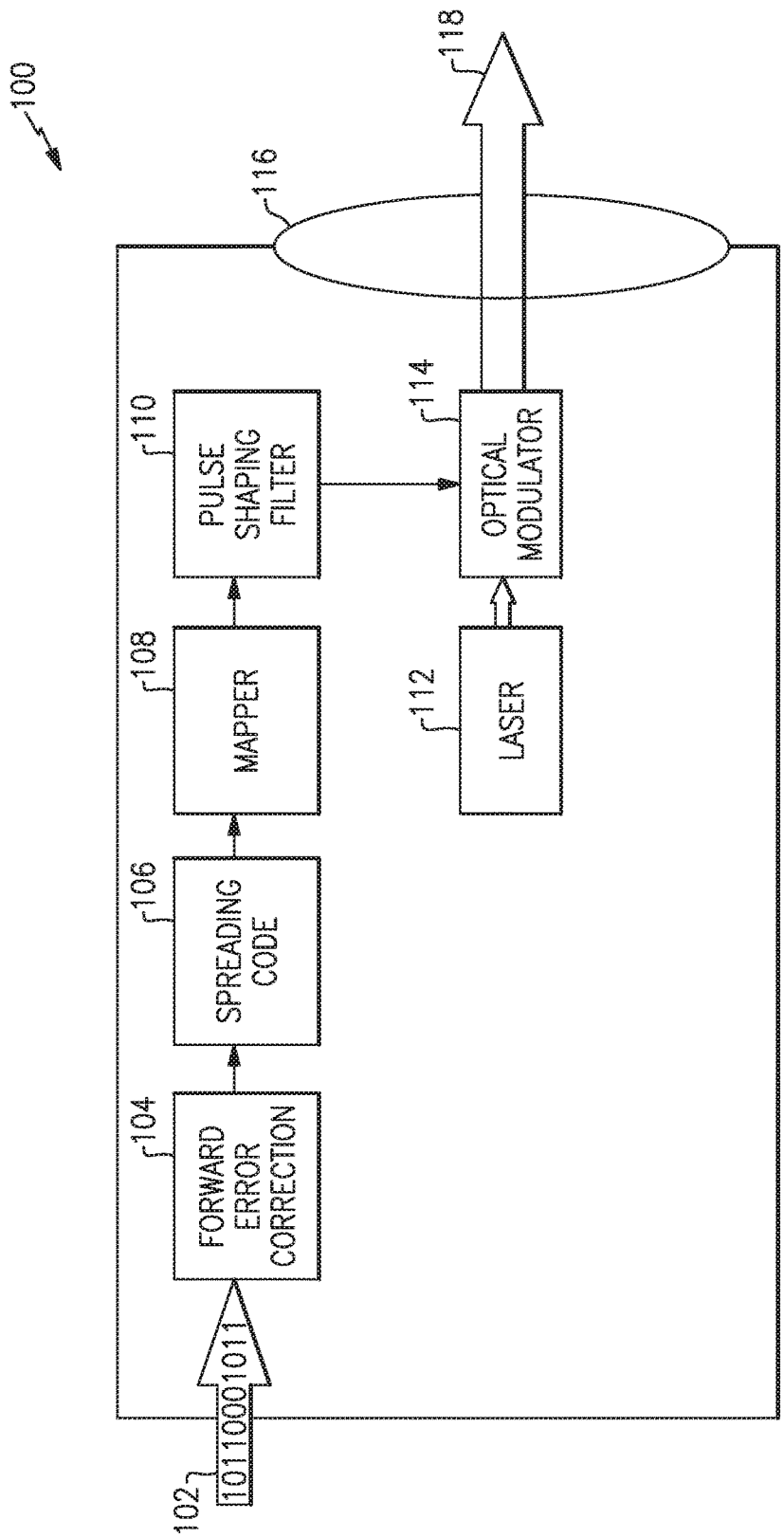
FIG. 1 is a block diagram of a notional optical transmitter for use with various examples described herein.

Various aspects and embodiments are directed to improved systems and methods for demodulation of phase-encoded (i.e., phase modulated) optical signals. In certain examples, the system includes an optical resonator, such as a Fabry-Perot filter/resonator or a micro-ring, which converts a received phase-encoded optical signal into a directly detectable intensity modulated output signal.

Phase encoded optical signals may come from numerous sources and/or be generated by numerous processes. Detection of the phase encoding may therefore be useful for many purposes. A coherent optical signal, such as a laser beam, may be purposefully modulated by a data communications transmitter for instance, to encode communicated information on the optical signal. Other information, such as timing and/or time stamp information, may be purposefully encoded as a phase modulation. Numerous processes may phase modulate a coherent light source, and from which information about the process may be recovered by appropriate demodulation (e.g., interpreting) of the phase modulated optical signal. For example, various measurement systems may transmit an optical signal and analyze a reflected signal to determine dimensions, movement, defects, etc. Examples of various systems for which demodulation of phase modulated optical signals may be beneficial include target designators, laser guidance systems, laser sight, laser scanners, 3D scanners, homing beacons and/or surveying systems, as well as communication systems. In various of these examples, an optical signal may arrive via a free space signal path (e.g., free space optical, FSO) or a fiber or other waveguide system. Systems and method for demodulation of phase modulated optical signals in accord with aspects and examples disclosed herein may be beneficially applied to any of the above example optical systems, or others, to receive, detect, recover, etc. useful information from an optical signal having phase encoding.

As discussed above, some examples of typical phase modulation receivers include local oscillators, Fiber Bragg Gratings, or delay line interferometers. Each of these receivers has significant drawbacks. They typically require components that are complex, large, and/or costly, and often have significant functional limitations. For example, many conventional approaches include a laser positioned within the receiver to convert the phase modulation to amplitude modulation, requiring a highly stable laser having a narrow-line width. Another typical approach uses a FBG to convert the phase modulation to amplitude modulation, which requires an optical circulator element, thereby increasing the complexity, size, and cost. A further conventional approach uses a Mach-Zehnder delay line interferometer and is limited to a single communication data rate.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Many optical communication receivers (e.g., coherent receivers) require a stable clock in order to accurately perform demodulation processes for a received signal, and may also require sophisticated optics such as 90-degree hybrids, phase shifters, and the like, especially when modulation includes encoding of information in polarization of the optical signal. In contrast, optical receivers in accord with the aspects and examples disclosed herein do not require a local coherent clock source nor significant optical components to achieve the same receiver capabilities as a conventional optical receiver. The benefits are achieved, at least in part, by an optical front-end that includes an optical resonator capable of detecting modulation transitions, such as phase variations, in an optical signal without a coherent reference source. The optical front-end further transforms the modulation, e.g., phase modulation, into an intensity modulation that allows simplified processing, potentially in the electrical domain.

Figure 2:
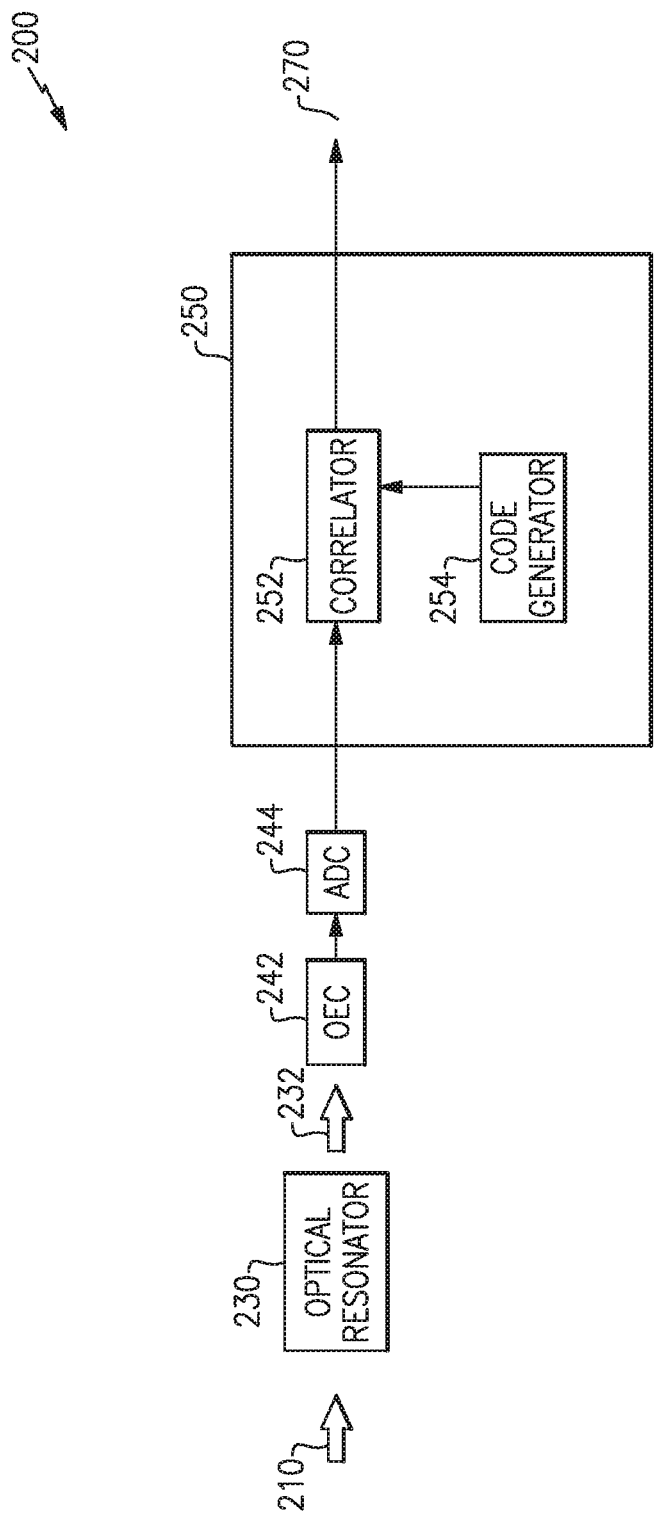
FIG. 2 is a block diagram of an optical receiver according to various examples described herein.

A functional block diagram of one example of a transmitter (e.g., optical transmitter 100) is illustrated in FIG. 1, and a functional block diagram of one example of a receiver (e.g., optical receiver 200) is illustrated in FIG. 2. The transmitter illustrated in FIG. 1 may be combined with the receiver illustrated in FIG. 2 to provide one example of a communication assembly, as will be readily apparent to one of ordinary skill in the art given the benefit of this disclosure.

Though the components of the example optical transmitter 100 shown in FIG. 1 and the optical receiver 200 shown in FIG. 2 may be shown and described as discrete elements in a block diagram, and may be referred to as "module", "circuitry", or "circuit," unless otherwise indicated, the components may be implemented as one of, or a combination of, analog circuitry, digital circuitry, or one or more microprocessors executing software instructions (e.g., predefined routines). In particular, the software instructions may include digital signal processing (DSP) instructions. Unless otherwise indicated, signal lines between components of the optical transmitter 100 and components of the optical receiver 200 may be implemented as discrete analog, digital, or optical signal lines. Some of the processing operations may be expressed in terms of calculations or determinations by the optical transmitter 100, the optical receiver 200, a controller, or other components. The equivalent of calculating and determining values, or other elements, can be performed by any suitable analog or digital signal processing techniques and are included within the scope of this disclosure. Unless otherwise indicated, control signals may be encoded in either digital or analog form.

Referring to FIG. 1, one example of an optical transmitter 100 may include an input 102 to receive a data payload, a forward error correction (FEC) module 104, a spreading module 106, a mapping module 108, a pulse-shaping filter 110, an optical source (e.g., a laser) 112, a modulator 114, and optics 116, and an output 118 to provide an optical signal output.

In the transmitter 100, the FEC module 104 implements forward error correction by adding redundancy to the data with a block code or convolution code. For example, the FEC module 104 may repeat one or more bits within the data payload to reduce an effect that the transmission medium may have on the transmitted signal waveform. Accordingly, in various examples the optical transmitter 100 may include a FEC module 104 to control errors that may result from transmitting the data payload through a noisy or lossy medium.

The transmitter 100 includes a spreading module 106 that applies to the data payload a spreading code useful for identifying and processing signal components in the receiver, and reduces the effects of inter-symbol interference (ISI). For example, the spreading module 106 may include a pseudo-random code generator (PRCG) and may apply direct sequence spread spectrum (DSSS) techniques known in the art, while other examples of transmitters or spreading modules may apply other forms of spreading.

The mapping module 108 maps the data payload to a particular modulation scheme, such as various positions of a particular phase and amplitude constellation, depending upon the types of modulation used by the transmitter, e.g., phase, amplitude, frequency, or any combination of these.

A pulse-shaping filter 110 may receive output of the mapping module 108 and control the modulator 114 to impose the modulation scheme on the optical source 112 to generate a modulated optical signal. In various examples, the modulator 114 may be an electro-optic modulator, and may include the optical source 112, such as a laser. In particular, the optical source 112 may emit a continuous carrier waveform that is modulated (e.g., in phase, amplitude, and/or frequency) for each symbol of the data payload to encode those symbols on the carrier waveform. The transmitter 100 may also include various optics 116 such as one or more mirrors or lenses to direct the optical signal at the output 118.

Referring to FIG. 2, illustrated is an example of an optical receiver 200 according to various examples discussed herein. FIG. 2 is described with continuing reference to the optical transmitter 100 of FIG. 1, which may communicate data payloads to the optical receiver 200. Additionally, a receiver and a transmitter may be paired together, e.g., to form a transceiver, capable of bidirectional data communication with another transmitter/receiver pair.

The illustrated receiver 200 receives an optical signal 210 and includes an optical resonator 230 and a digital processing subsystem 250 that provides an output 270. The optical resonator 230 may be coupled to the digital processing subsystem 250 by an optical-electrical converter 242 and an analog to digital converter 244, for example.

Examples of optical resonators 230 may include Fabry-Perot etalons, micro-rings, or other types of resonators. The optical resonator 230 is a component capable of sensing transitions, such as phase variations, representative of modulation performed at the transmitter, and transforming the transitions into intensity modulation of an output optical signal, e.g., output optical signal 232. The optical resonator 230 converts the modulation of the arriving optical signal 210 in part by interaction of the arriving optical signal 210 with resonant optical energy built-up in the optical resonator 230.

For example, an etalon is a component having a pair of parallel semi-reflective surfaces, that may include a transparent material in between, and has one or more characteristic resonant frequencies, each associated with a certain wavelength of light, based upon the spacing (i.e., dimensional length) between the semi-reflective surfaces. The surfaces are semi-reflective and also semi-transmissive, in that they allow some light through, and therefore the arriving optical signal 210 may be allowed into the etalon and may resonate inside the etalon (i.e., between the two semi-reflective surfaces). Additionally, some of the light resonating inside is allowed out of the etalon (through the semi-transmissive surface). Light emerging from the etalon is shown, for example, as the optical signal 232 in FIG. 2.

An optical signal received by an optical resonator 230, an etalon in this example, may establish a steady-state energy-conserving condition in which optical signal energy continuously arrives at the etalon, accumulates or adds to built-up resonating energy existing inside the etalon, and emerges from the etalon at a constant rate. A change in the arriving phase, frequency, or amplitude of the optical signal may disrupt the resonance inside the etalon, and the light intensity emerging from the etalon is also disrupted, until a steady state condition is re-established. Accordingly, a change in phase, frequency, or amplitude of the arriving optical signal 210 causes a change in intensity of the emerging optical signal 232. A large phase transition in the arriving optical signal 210, for example, causes a large (but temporary) intensity change in the emerging optical signal 232. Similar operation occurs in a micro-ring or other optical resonator, and accordingly an optical resonator 230 functions as a demodulator, or a modulation converter, for an optical signal 210. The emerging optical signal 232 may therefore carry the same information content as the arriving optical signal 210, but in intensity modulated form.

The emerging intensity-modulated optical signal 232 may be converted to an electrical signal by an optical-electrical converter, e.g., OEC 242, which may include a photodetector, such as a photodiode, for example. Accordingly, the output of the OEC 242 may be an amplitude modulated signal representative of the intensity-modulated optical signal 232, and may be converted to a digital form by an analog to digital converter, e.g., ADC 244. The digital signal is provided to the digital processing subsystem 250 for digital processing. The digital processing subsystem 250 processes the digital signal to receive the information-carrying content of the optical signal 210. The basic operation of the digital processing subsystem 250 is known in the art, and may include, e.g., a correlator 252 and a code generator 254, but the details of any particular implementation may vary.

In various examples, a receiver in accord with aspects and examples disclosed herein may include additional or fewer optics than discussed above, and may omit or add various components relative to those discussed above. For example, focusing optics may be included to receive the emerging optical signal 232 from the optical resonator 230 and to focus the optical signal 232 on the OEC 242. Certain examples may use analog receiver circuitry and therefore may omit one or more of the ADCs 224. Various examples may include a channel estimator as part of the digital processing subsystem 250 to provide phase rotation or other signal adjustments as may be known in the art.

As discussed above, suitable optical resonators may include etalons, micro-rings, or other structures. Some detail of at least one example of an etalon is discussed below with respect to FIG. 3. A micro-ring is a resonator formed of one or more waveguides in which at least one is a closed loop such that optical signal energy traversing "around" the loop may be phase aligned with a dimension of the loop at one or more frequencies. Accordingly, optical signal energy traversing the loop may constructively interfere with itself, at certain frequencies, to sustain the optical signal energy within the loop. At other frequencies, optical signal energy traversing the loop will destructively interfere with itself thereby destroying, or rejecting, a build-up of optical signal energy at that frequency. The closed loop is also coupled to some type of input and output, to allow light to enter the loop, e.g., an aperture, and to let light out of the loop.

Figure 3:
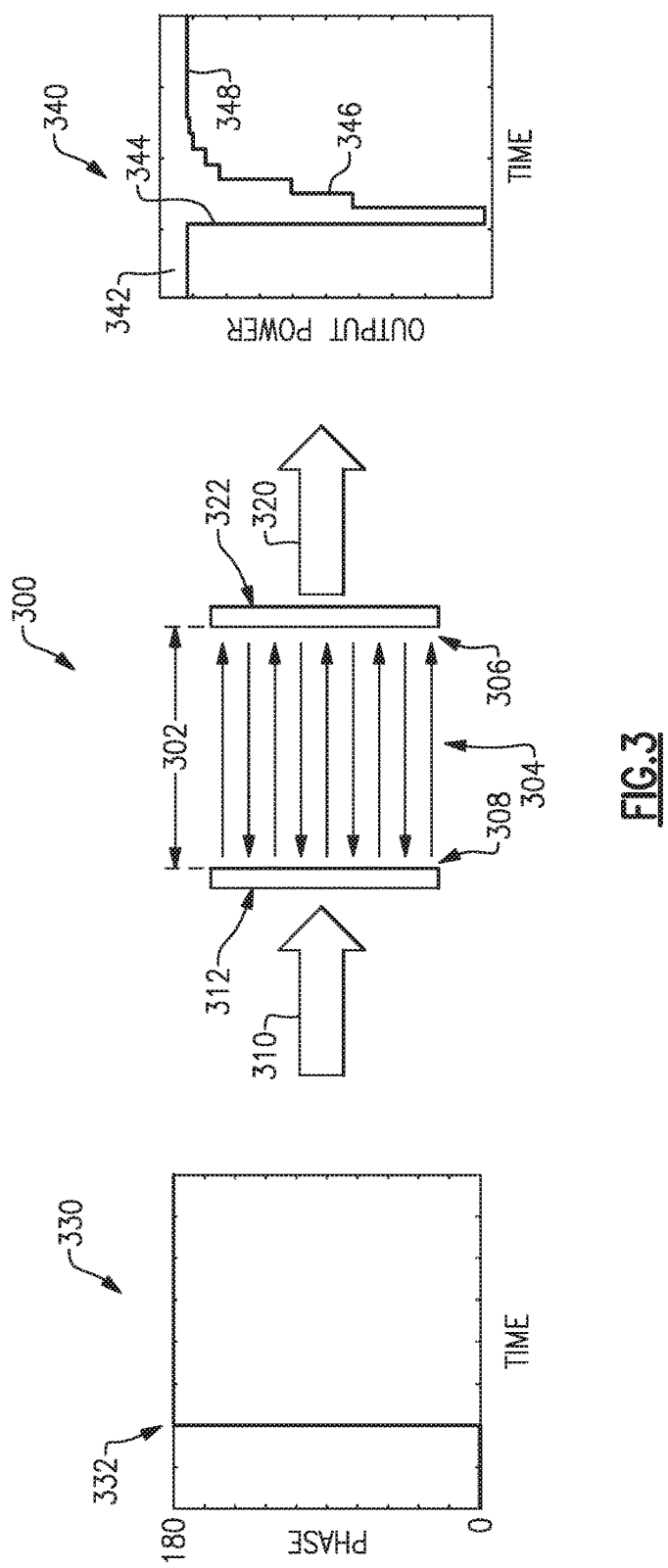
FIG. 3 is a schematic diagram of an example of an optical resonator, including a graph of received signal phase and a graph of output intensity of the optical resonator.

FIG. 3 illustrates an example of an etalon 300 which may be used in various examples of a receiver in accord with aspects and embodiments described herein, for example, as the optical resonator 230 in FIG. 2. In particular, a receiver may use the etalon 300 to convert phase modulations of a received optical communication signal 310 into intensity or amplitude modulations of an output optical signal 320. The intensity or amplitude modulated output optical signal 320 may then be converted to an electrical signal, with corresponding amplitude variations representative of the phase modulation of the received optical signal 310. The etalon 300 causes the received optical signal 310 to resonantly interact with itself, internal to the etalon 300, such that phase changes in the received optical signal 310 disrupt the resonance and cause amplitude (or intensity) variations at the output optical signal 320, which may be coupled directly to a detector.

In particular examples, the etalon 300 is designed to have a resonant frequency aligned with the source, e.g., a transmit laser, of the received optical communication signal 310. In various examples, a dimensional scale, e.g., length 302, of the etalon 300 is selected such that the etalon 300 exhibits optical resonance at the wavelength of the received optical communication signal 310. In certain examples, such dimensional scales are much shorter than the length of a transmitted symbol, which is the distance traveled by the optical signal between transitions that convey information, e.g., between phase changes in a phase modulated signal.

The etalon 300 includes an interior 304 with semi-reflective surfaces 306, 308 that reflect optical signal energy into the interior 304. An input side 312 allows optical signal energy, such as the optical communication signal 310, into the interior 304. The input side 312 thereby forms an aperture through which the arriving optical communication signal 310 is received. An output side 322 forms an optical output, at least in part by action of the semi-reflective surface 306 to allow a portion of trapped optical signal energy from the interior 304 to emerge as an output optical signal, such as the output optical signal 320. Accordingly, the semi-reflective surface 306 is also semi-transmissive, such that optical signal energy arriving (from the interior 304) at the semi-reflective surface 306 is partially reflected back to the interior 304 and partially transmitted through to the output side 322. The etalon 300 may have varying levels of reflectivity of the semi-reflective surfaces 306, 308. In certain examples, the reflectivity may be expressed as a fraction of light amplitude reflected back into the interior 304, or may be expressed as a fraction of light intensity reflected back into the interior 304. In a particular example, an amplitude reflectivity of the first semi-reflective surface 308 may be $r_1=0.999$ and an amplitude reflectivity of the second semi-reflective surface 306 may be $r_2=0.985$. In other examples the reflectivity of each of the first and second semi-reflective surfaces may be different, and may be any suitable value for a particular implementation. The etalon 300 is one example of a suitable optical resonator in accord with aspects and embodiments described herein.

According to certain examples, an optical resonator, such as the etalon 300, will coherently develop an output signal based on the input signal, and maintain a given level of the output signal until a modulation in the phase of the input signal occurs. When a phase modulation occurs in the input signal, destructive interference causes a phase-dependent change in the amplitude of the output signal. This can be seen in the input phase plot 330 and the output power plot 340 illustrated in FIG. 3. Accordingly, a received phase encoded optical communication signal, such as received optical signal 310, is converted to an amplitude varying signal, such as the output optical signal 320, by the optical resonator, such as the etalon 300. The output optical signal 320 is suitable for direct detection by a sensor, such as the OEC 242 of FIG. 2. Additionally, an optical resonator will function over a broad range of data rates without the need to modify the optical characteristics of the system, such as detector setup, path length adjustments, delay elements, or the like. For example, the ability of the etalon 300 to convert an arriving phase modulated input optical signal 310 into an intensity modulated output optical signal 320 may be independent of the modulation rate at which the input phase is changing, in some examples.

The use of the term "etalon" throughout this disclosure is not intended to be limiting and as used herein may include any of multiple structures, including plates with reflecting surfaces as well as parallel mirrors with various materials in between, and may also be referred to as cavities, interferometers, and the like. Additionally, etalon structures may be formed as a laminate, layer, film, coating, or the like.

FIG. 3 further illustrates operation of the etalon 300 with reference to the output power plot 340 of optical signal intensity (as output power) emerging from an optical resonator, such as the etalon 300, during a phase transition 332 in the received optical signal 310. At point 342 the etalon 300 is in a steady-state resonance condition wherein a steady intensity of light emerges. At point 344 a phase transition 332 occurs in the arriving optical signal 310, temporarily disrupting the steady-state and causing a change in the emerging light intensity. During successive reflections inside the etalon, labeled at point 346, resonance is being re-established and the emerging light intensity increases until, at point 348, a steady intensity of light emerges when the etalon 300 has returned to a steady-state condition.

Accordingly, variation in emerging light intensity from an optical resonator, such as the etalon 300 or a micro-ring, may indicate a phase transition and/or variation occurred in an arriving optical signal, and such may be used by appropriate signal processing to determine useful information from the phase variation by analyzing the emerging light intensity.

As a particular example, an etalon tuned to the arriving wavelength reacts to a phase variation in the arriving optical signal in accord with the discussion above and as illustrated in FIG. 3. If the arriving optical signal is modulated with binary phase shift keying (BPSK), for example, the output illustrated in FIG. 3 indicates each phase shift, and accordingly the information carried in the phase shift keying may be recovered from the intensity variations at the output optical signal 320. It should be understood by those of skill in the art with the benefit of this disclosure, that such information recovery is achieved without the necessity for a local coherent clock source to demodulate the arriving optical signal.

Figure 4:
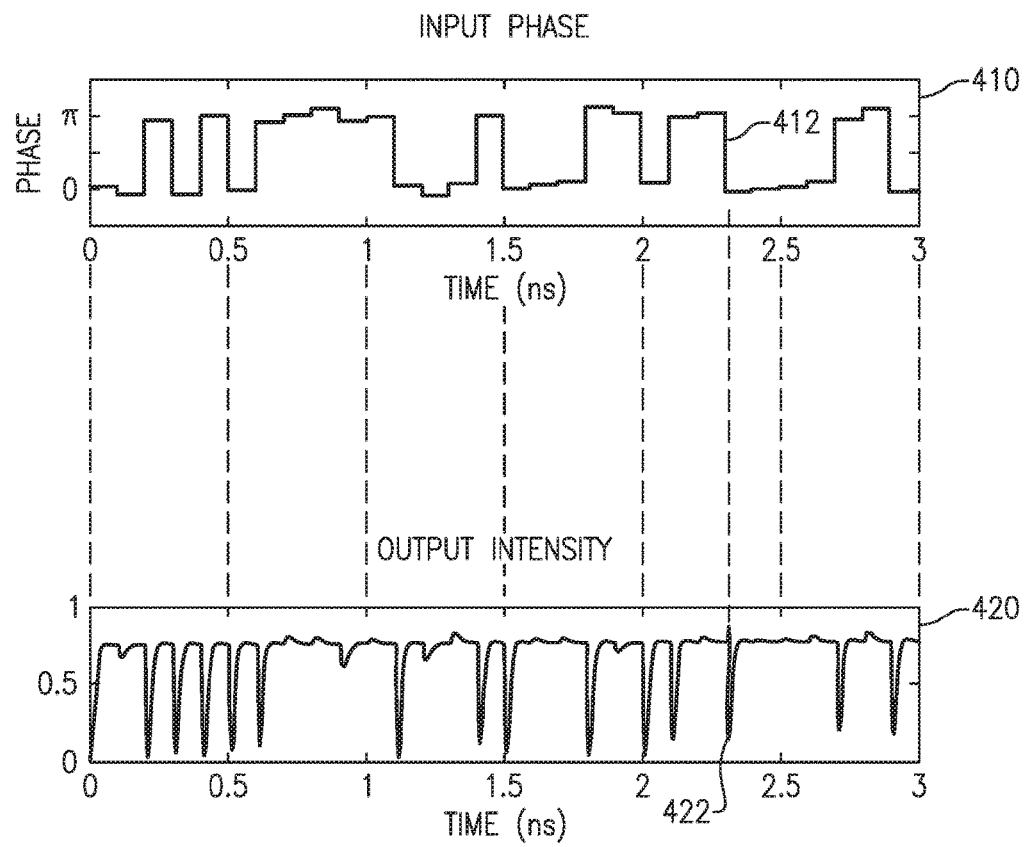
FIG. 4 is a graph of optical input phase and output intensity from an example of the optical resonator of FIG. 3.

FIG. 4 illustrates a plot 410 of varying phase of a received phase modulated optical signal, and a plot 420 of the resulting intensity of an output optical signal, from an optical resonator such as the etalon 300. The results shown in FIG. 4 are for an etalon having a length of 18 µm and with reflectance of 0.999 at the semi-reflective surface 308 and reflectance of 0.985 at the semi-reflective surface 306. The otherwise continuous input phase (shown in the plot 410) changes at intervals according to the modulated information content, and the plot 410 can be seen as a sequence of binary data, such as high and low bits corresponding to ones and zeros, for example. Among the multiple phase transitions shown in the plot 410, a phase transition 412 is specifically associated with a change 422 in output intensity, shown in the plot 420. Each phase variation in the received optical signal causes a respective change in the output intensity. Accordingly, a receiver can track the changes in output intensity and thereby recover the information content of the received phase modulated optical signal.

FIGS. 5A-5F illustrate numerous examples of output intensity from various etalons in response to a received phase modulated optical signal of a particular wavelength, with the input phase shown in the plots 510a-f. The plots 510a-f are identical for all the various etalons associated with FIGS. 5A-5F. Each of the FIGS. 5A-5F is associated with a single etalon of differing dimensional lengths, respectively. Each of the output intensity plots 520, 530, 540, 550 is associated with decreasing tolerance of the dimensional length, e.g., how accurately each etalon is manufactured and accordingly how well tuned is each etalon. As would be expected by those of skill in the art, the output intensity from an etalon with a smaller dimension is more quickly disrupted by a transition in the input signal, and more quickly re-establishes steady state, relative to an etalon with a larger dimension, as can be seen by comparison of, e.g., output intensity plot 520a for an etalon having relatively small dimensional length to output intensity plot 520f for an etalon having relatively large dimensional length. As would also be expected by those of skill in the art, an etalon manufactured to a more accurate tolerance, i.e., more accurately tuned to the particular wavelength, provides a higher resonant output signal intensity at steady state and exhibits greater sensitivity to a transition in the input signal relative to an etalon manufactured to a less accurate tolerance, as can be seen by comparison of, e.g., any of the plots 520 for relatively tight tolerance to the corresponding plot 550 for relatively loose tolerance.

Table 1 provides a summary of the etalon dimensional lengths illustrated in FIGS. 5A-5F. Table 2 provides a summary of the etalon tolerance associated with the output intensity plots 520, 530, 540, 550. Etalon tolerance is expressed as the ratio of the maximum error in dimensional length ($\Delta L$) to the wavelength of the intended arriving optical signal ($\lambda$).

TABLE 1

Figure 5A:
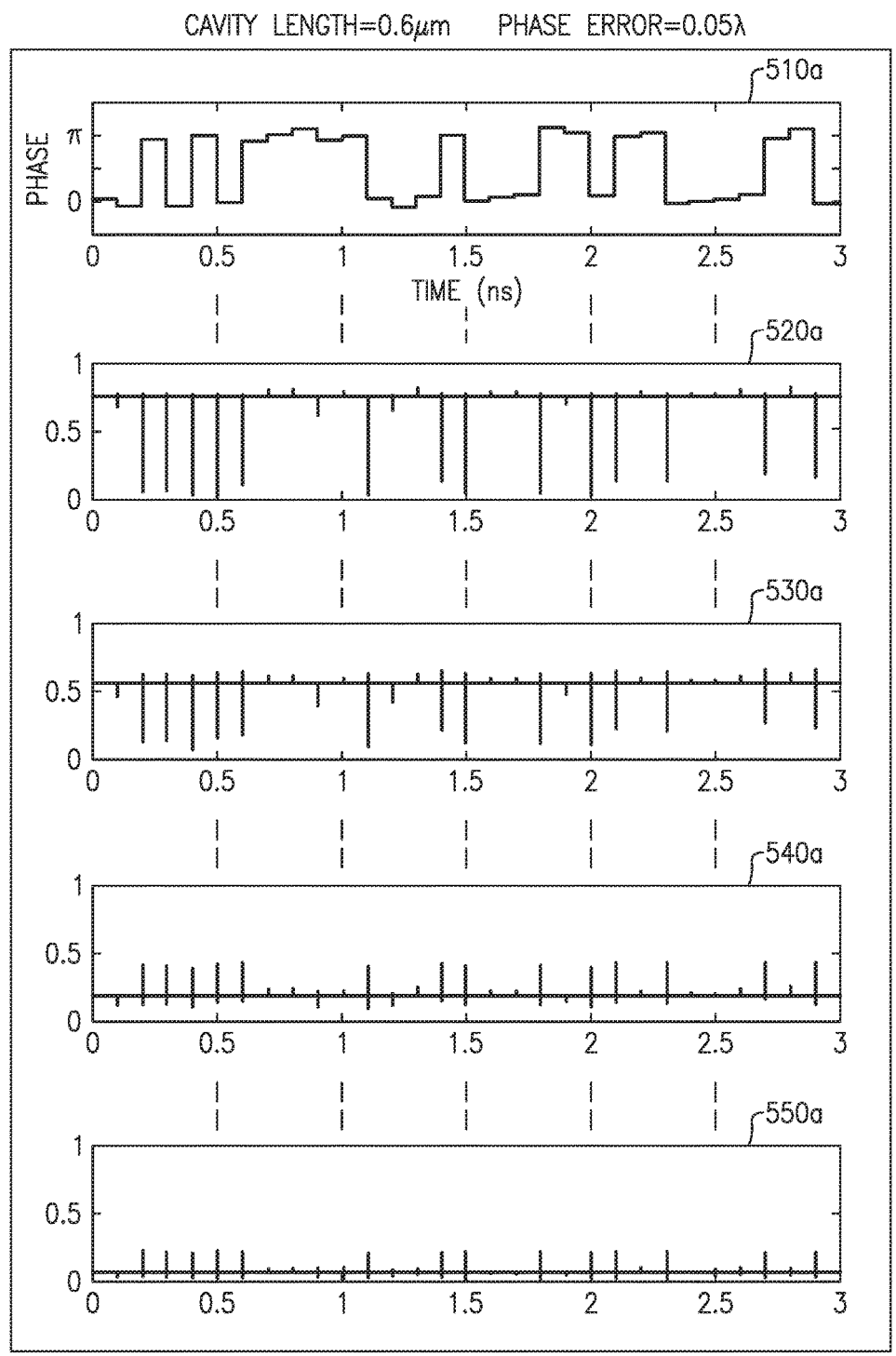
FIGS. 5A-5F are plot graphs illustrating optical output intensity from various optical resonators.
Figure 5B:
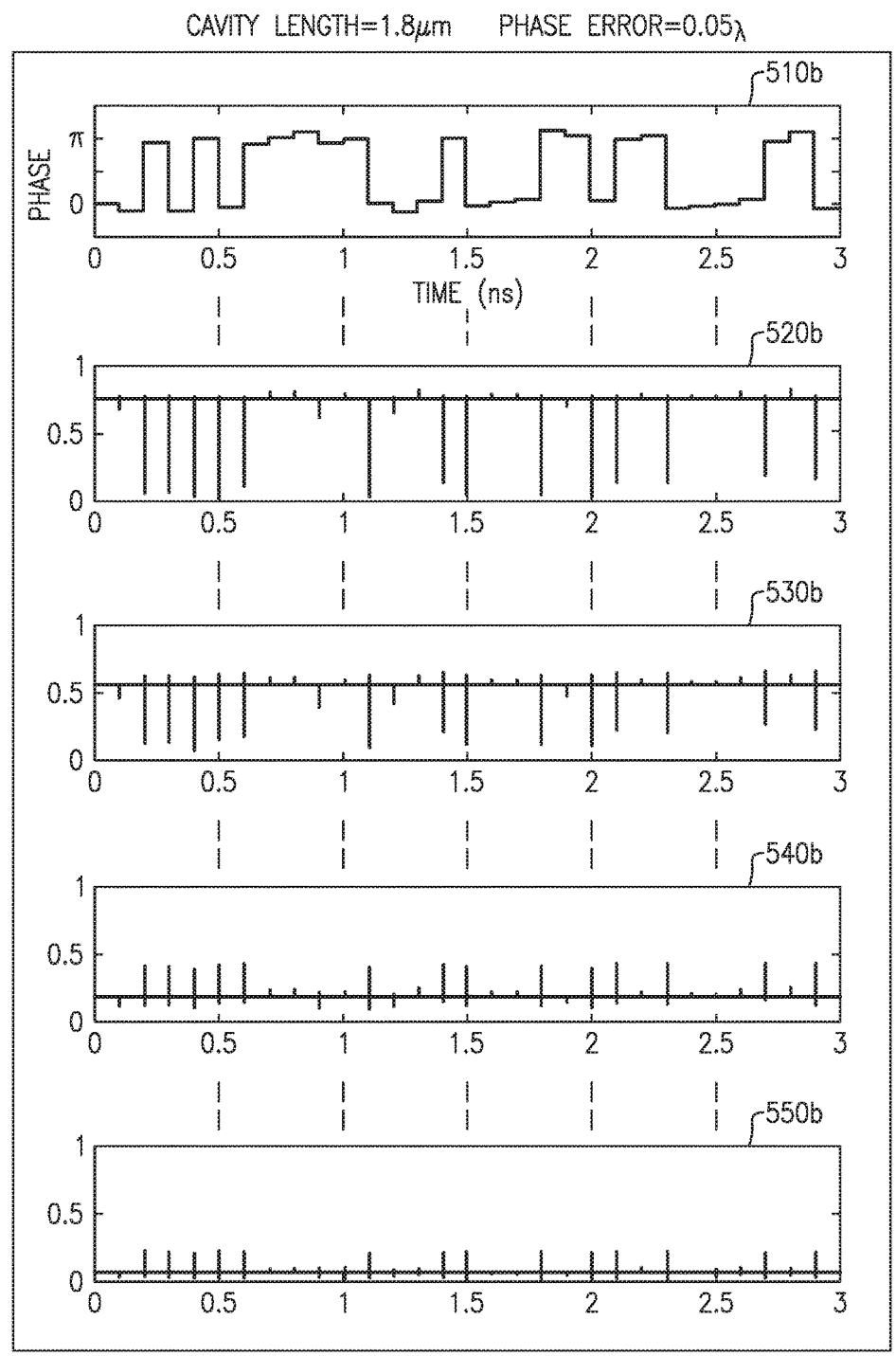
Figure 5C:
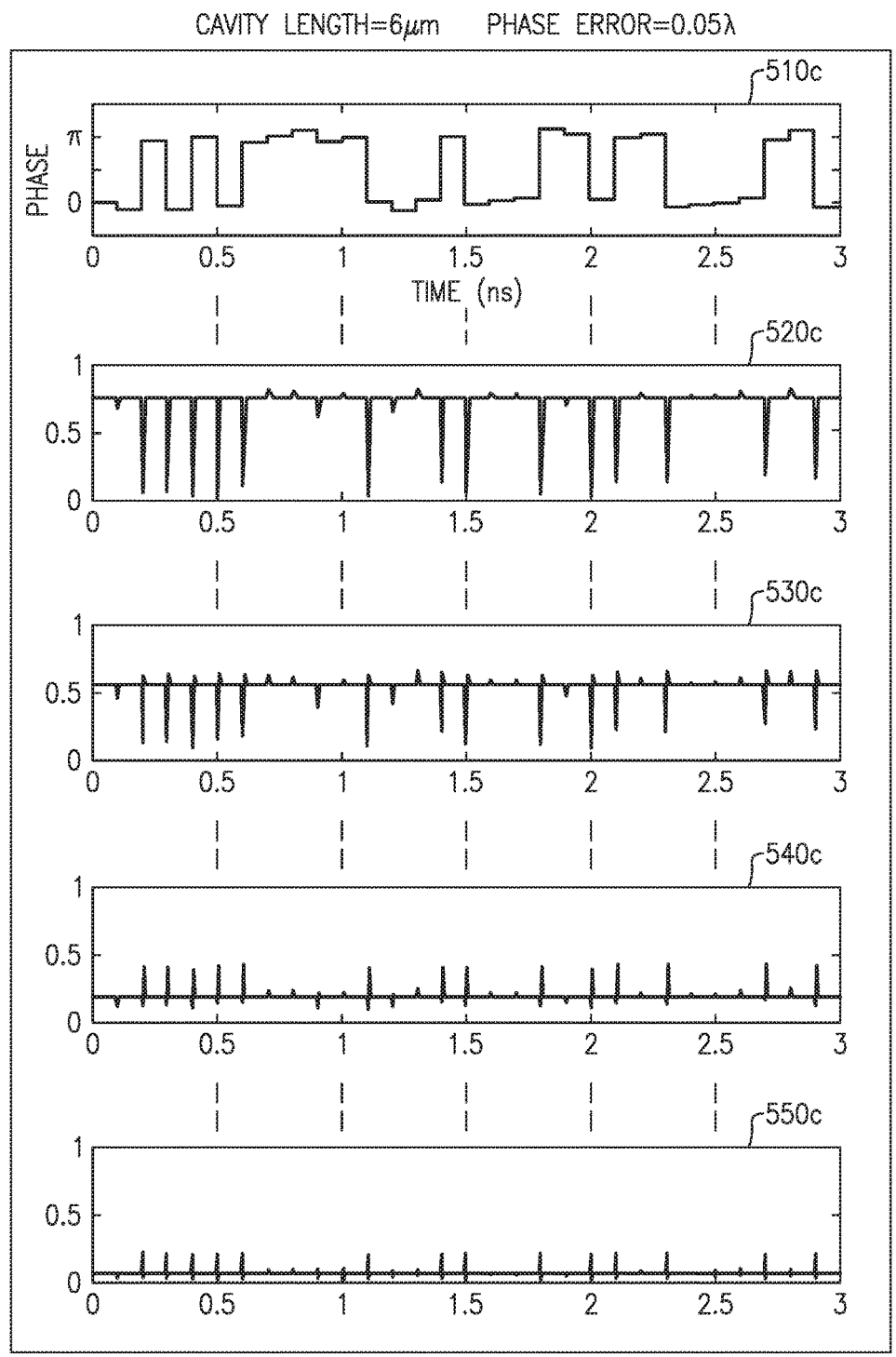
Figure 5D:
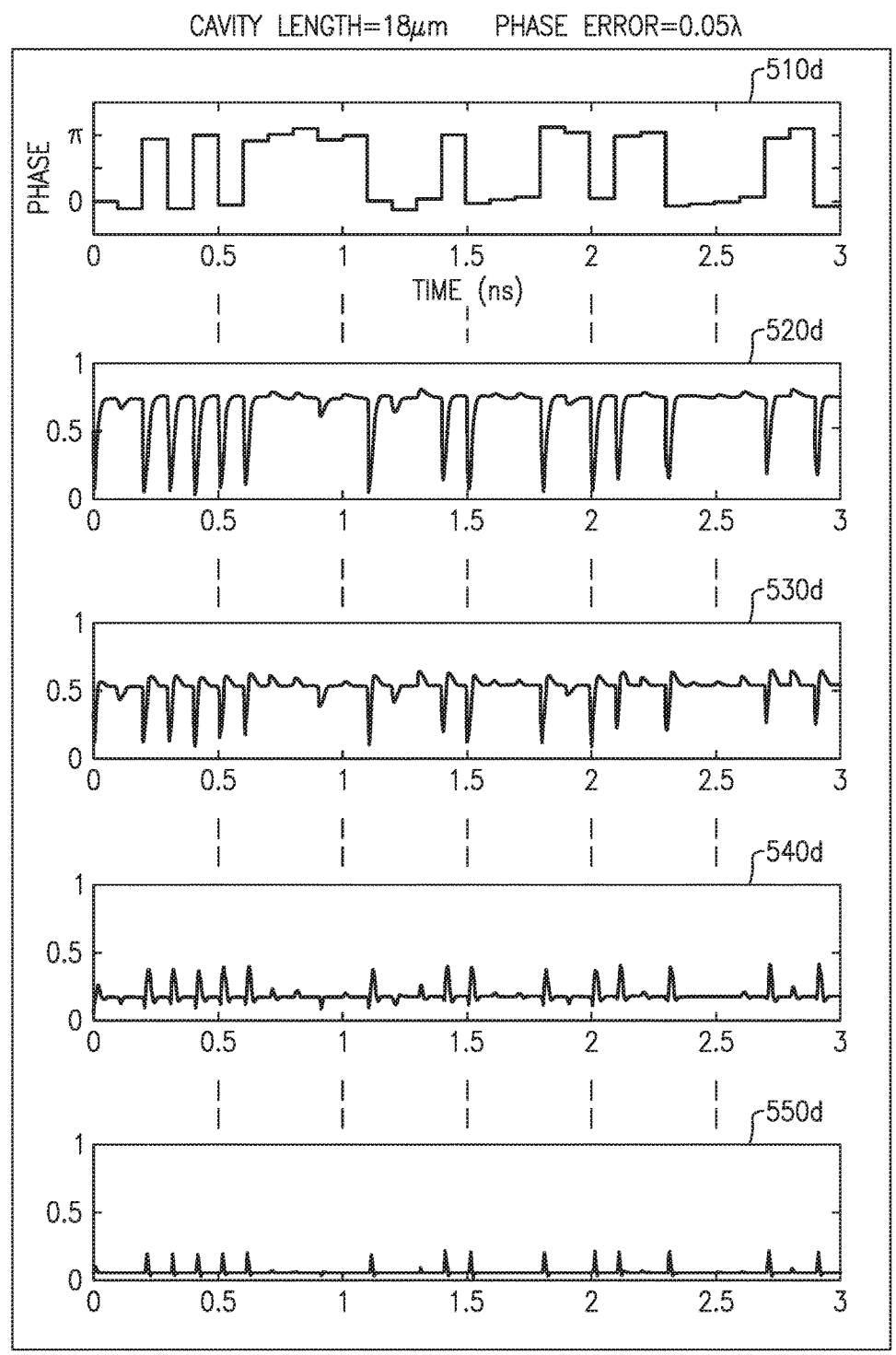
Figure 5E:
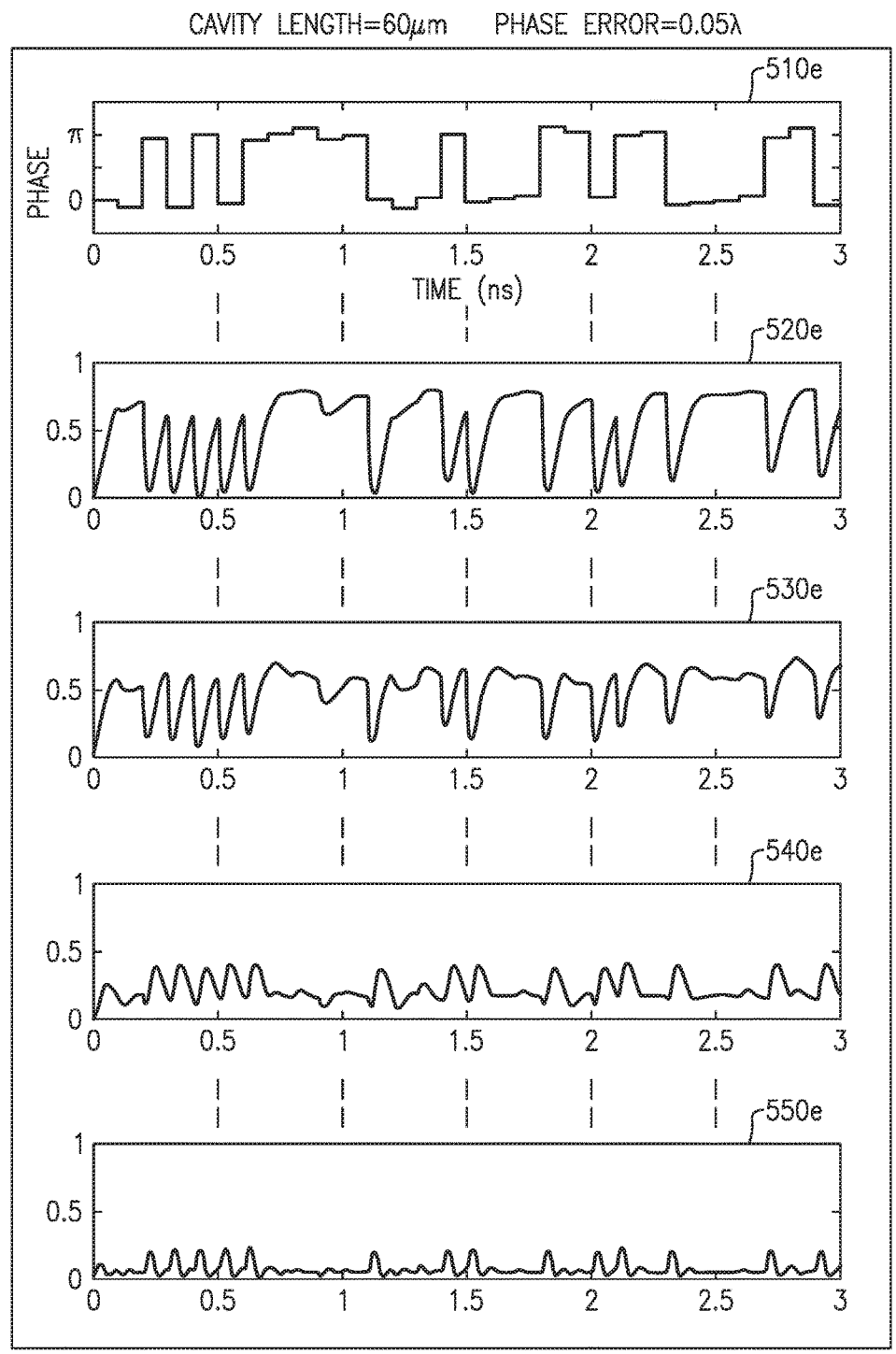
Figure 5F:
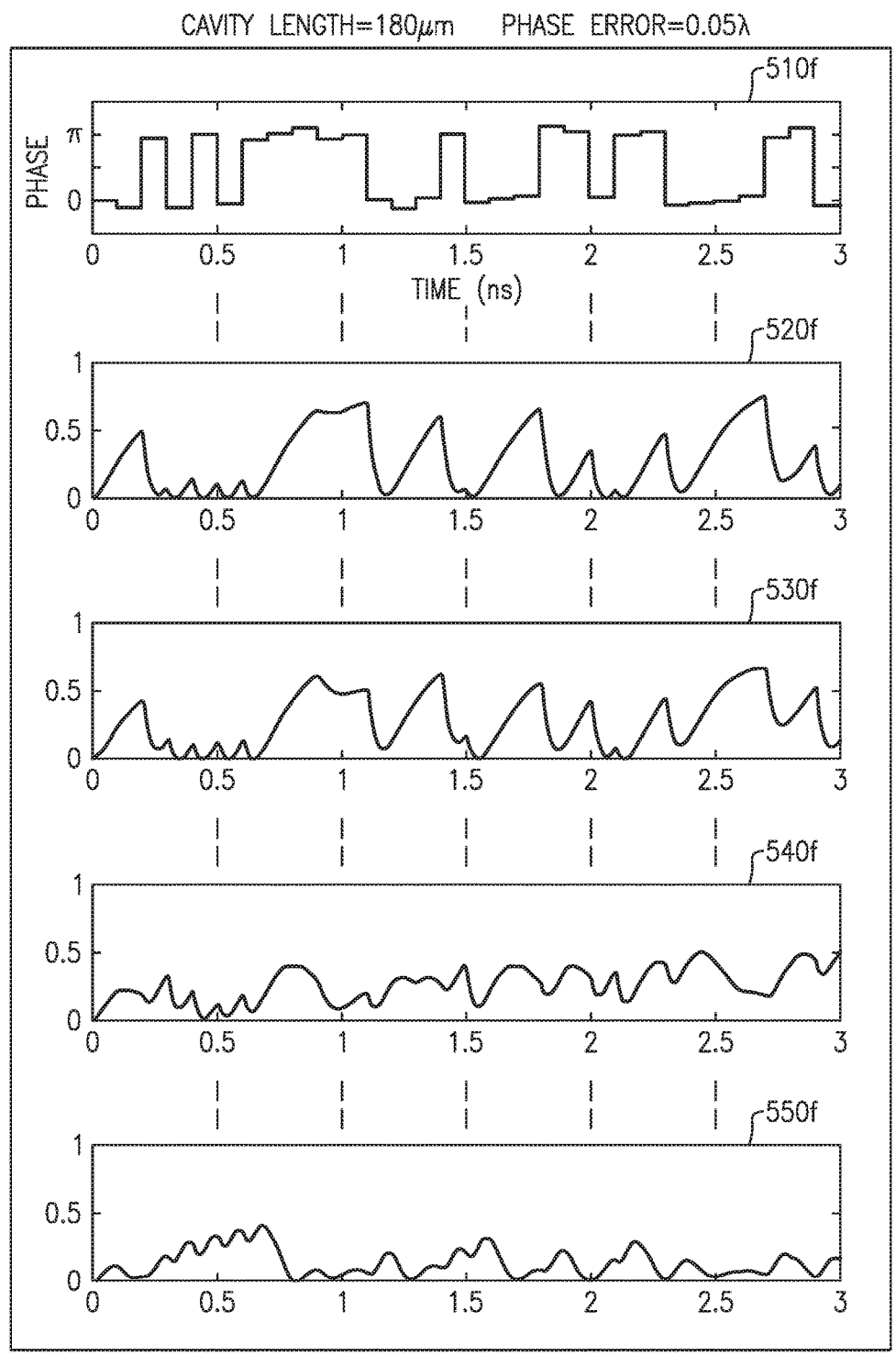

| FIG. | Etalon Dimensional Length |
|---|---|
| FIG. 5A | 0.6 µm |
| FIG. 5B | 1.8 µm |
| FIG. 5C | 6.0 µm |
| FIG. 5D | 18 µm |
| FIG. 5E | 60 µm |
| FIG. 5F | 180 µm |

TABLE 2

| Plot | Etalon Tolerance ($\Delta L/\lambda$) |
|---|---|
| 520a-f | 0.001 |
| 530a-f | 0.002 |

TABLE 2-continued

| Plot | Etalon Tolerance (ΔL/λ) |
|---|---|
| 540a-f | 0.005 |
| 550a-f | 0.010 |

With reference to tables 1-2 and FIGS. 5A-5F, various embodiments may have various etalon dimensions and tolerances based upon particular design criteria and to accommodate varying operational characteristics. In some examples, various etalon dimensions and tolerances may be selected to trade off, or balance, how strongly and/or how quickly the etalon responds to transitions in an arriving optical communication signal, such as phase transitions associated with phase modulation, and how quickly the etalon approaches a return to steady-state after a transition. Additionally, various etalon dimensions and tolerances may be selected to optimize a receiver, such as the receiver 200, for a particular communication data rate and/or a particular wavelength.

With continued reference to tables 1-2 and FIGS. 5A-5F, various dimensions of an optical resonator in accord with aspects and examples disclosed herein may be significantly smaller than a dimension associated with a baud rate or symbol length of a phase encoded optical signal. In some examples, a resonant dimension (e.g., etalon length, loop length of a micro-ring, etc.) may provide an effective optical length less than half the distance associated with a baud rate or symbol length. For example, a baud rate may be a rate at which modulation variations occur, and a symbol length may be the distance an optical signal travels between modulation variations. In the case of an optical resonator, the distance the optical signal travels may be based upon the material, or optical media, from which the optical resonator is constructed. For an optical resonator such as an etalon or micro-ring capable of storing optical signal energy and providing resonance through constructive and destructive interference, optical signal energy remains in the resonator for a greater amount of time such that an effective optical length is greater than the resonator's physical length, i.e., optical signal energy spends more time in the resonator than if the resonator allowed the optical signal to pass through without resonantly accumulating. Accordingly, a time until the next modulation variation (i.e., inverse of the baud rate) may be enough time for an arriving optical signal to traverse the resonant dimension of the optical resonator numerous times. In certain examples, the resonant dimension (etalon length, loop length) may provide an effective optical length one third or less of the symbol length. In some examples, the physical dimension of the etalon length or the loop length may be on the order of one tenth of the symbol length or less, (e.g., depending upon the reflectivity of the etalon surfaces, for example) to provide an effective optical length of one third of the symbol length. Accordingly, in some examples, a symbol length may be as short as 10 times the physical dimension of the etalon or loop length, or less. Additionally, the symbol length may be as long as 5,000 times the physical dimension of the etalon or loop length, or more, in accord with aspects and examples being capable of accommodating a wide variety of modulation rates as previously discussed.

Additional benefits associated with the use of an optical resonator, such as an etalon or micro-ring, as a front end component combined with a processing subsystem for the reception of modulated optical communication signals include flexible operation, capable of receiving signals from free space or via a fiber coupling or other optical waveguides and/or components. An optical resonator may also provide noise reduction due to rejection of optical signal energy outside the intended wavelength, e.g., due to the resonate nature. Additionally, an optical resonator may be provided with coatings to or other features to further reject undesired optical wavelengths, including alternate resonant wavelengths that are not intended to be part of the received communication signal. For example, a particular length (or width, depending upon perspective) of an optical component may resonate at multiple wavelengths but coatings and/or other design features may act to limit the build-up of optical signal energy at the undesired wavelengths, such as a coating that provides reduced reflectivity at alternate wavelengths, or filters integrated with or placed before the aperture of the optical resonator, or others. Additional modulation formats may also be accommodated by particular design characteristics of an optical resonator. The resonant nature may respond to pulse width or other modulations in addition to purely phase transitions. For example, a pulse width modulated signal causes the signal energy trapped in the resonator to build up or approach a steady-state value, and the longer the pulse width the closer the resonator will come to, or the longer it will remain in, a steady-state signal energy condition. When the pulse ceases, the optical resonator's output will change similar in manner to a phase transition. Accordingly, amplitude and pulse width modulations of an arriving optical signal may be detected by processing the optical intensity output of the optical resonator.

As discussed above with reference to FIGS. 1 and 2, in various examples components of the transmitter 100 and/or receiver 200 may be implemented as one of, or a combination of, analog circuitry, digital circuitry, or one or more digital signal processors (DSP) or other microprocessors executing software instructions. Software instructions may include DSP instructions.

Figure 6:
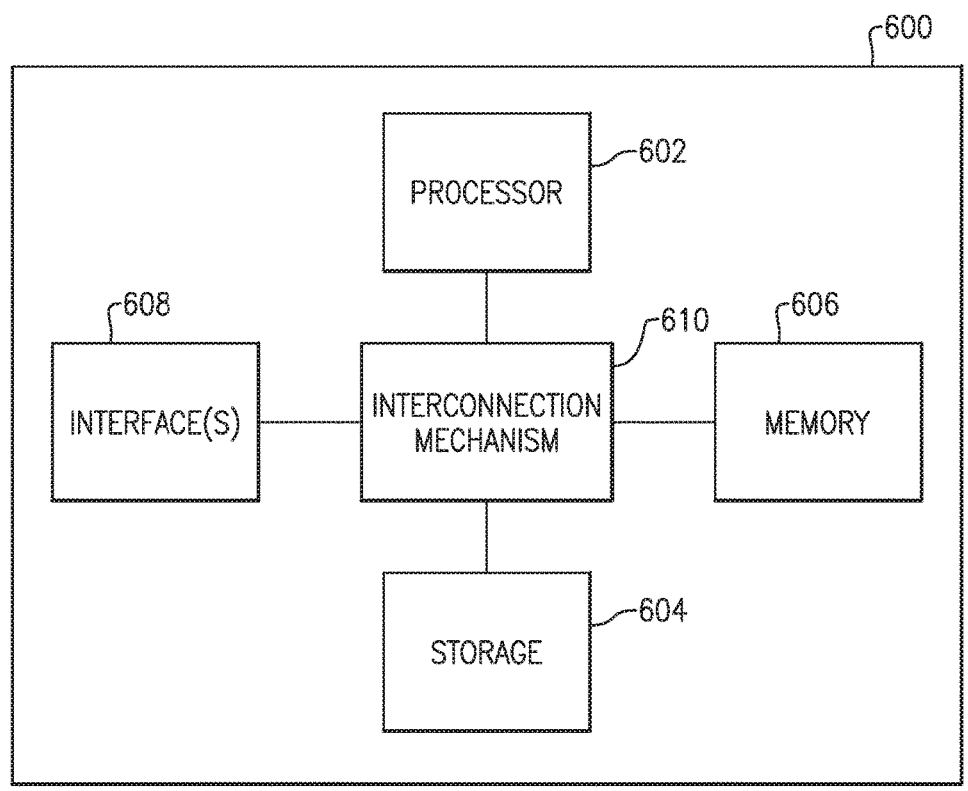
FIG. 6 is a functional block diagram of an example of a controller configured to implement various examples of the processes described herein.

FIG. 6 illustrates one example of a control circuit (e.g., a controller 600) that may implement software routines corresponding to the FEC module 104, the spreading module 106, the mapping module 108, as illustrated in FIG. 1, and/or other components. The controller 600 may further implement software routines corresponding to the correlator 252 and/or the code generator 254 associated with the digital processing subsystem 250 of FIG. 2 and/or other components of a receiver 200. The controller 600 may include a processor 602, a data store 604, a memory 606, and one or more interfaces 608, such as a system interface and/or a user interface. While not explicitly illustrated in FIG. 6, in certain examples the controller 600 may be coupled to a power source. The power source may deliver power to one or more components of the controller 600, as well as other components of the optical transmitter 100 or optical receiver 200.

In FIG. 6, the processor 602 is coupled to the data storage 604, memory 606, and the various interfaces 608. The memory 606 stores programs (e.g., sequences of instructions coded to be executable by the processor 602) and data during operation of the controller 600. Thus, the memory 606 may be a relatively high performance, volatile, random access memory such as a dynamic random access memory ("DRAM") or static memory ("SRAM"). However, the memory 606 may include any device for storing data, such as a disk drive or other nonvolatile storage device. Various examples may organize the memory 606 into particularized and, in some cases, unique structures to perform the functions disclosed herein. These data structures may be sized and organized to store values for particular data and types of data.

The data storage 604 includes a computer readable and writeable data storage medium configured to store non-transitory instructions and other data, and can include non-volatile storage media, such as optical or magnetic disk, ROM or flash memory. The instructions may include executable programs or other code that can be executed by the at least one processor 602 to perform any of the functions described herein.

In various examples, the controller 600 includes several interface components 608, such as a system interface and/or a user interface. Each of the interface components 608 is configured to exchange, e.g., send or receive, data with other components of the controller 600 (and/or associated transmitter or receiver), or other devices in communication with the controller 600. According to various examples, the interface components 608 may include hardware components, software components, or a combination of hardware and software components.

In certain examples, components of the system interface couples the processor 602 to one or more other components of the optical transmitter 100 shown in FIG. 1, or of the optical receiver 200 shown in FIG. 2. The system interface may provide one or more control signals to any such components and may manage the operation of such components, as described above.

A user interface may include hardware and/or software components that allow a corresponding transmitter or receiver in which the controller 600 is incorporated to communicate with an external entity, such as a user. These components may be configured to receive information from user interactions with the user interface. Examples of the components that may be employed within the user interface include buttons, switches, light-emitting diodes, touch screens, displays, stored audio signals, voice recognition, or an application on a computer-enabled device in communication with the controller 600. Data received at the various interfaces may be provided to the processor 602, as illustrated in FIG. 6. Communication coupling (e.g., shown interconnection mechanism 610) between the processor 602, memory 606, data storage 604, and interface(s) 608 may be implemented as one or more physical busses in conformance with standard, proprietary, or specialized computing bus technologies.

The processor 602 performs a series of instructions that result in manipulated data that is stored in and retrieved from the data storage 604, as discussed above. In various examples, the series of instructions result in interpretation of the outputs from optical resonators as discussed above. Such instructions may correspond to commands for interpreting peaks and troughs of such output signals to determine phase, frequency, or amplitude changes (modulations) in an arriving optical signal, and/or recovering a data payload therefrom, as discussed herein.

The processor 602 may be any type of processor, multi-processor or controller, whether commercially available or specially manufactured. For instance, the processor may include a commercially available processor, such as a processor manufactured by INTEL, AMD, MOTOROLA, or FREESCALE. In some examples, the processor 602 may be configured to execute an operating system, such as a real-time operating system (RTOS), for instance RTLinux, or a non-real time operating system, such as BSD or GNU/Linux. The operating system may provide platform services to application software. These platform services may include inter-process and network communication, file system management and standard database manipulation. One or more of many operating systems may be used, and examples are not limited to any particular operating system or operating system characteristic.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only.

What is claimed is:

1. An optical signal receiver comprising:
   an optical resonator having an aperture to allow optical signal energy to enter and an output to allow a portion of optical signal energy to be emitted, the optical resonator configured to receive optical signal energy via the aperture, accumulate resonant optical signal energy inside the optical resonator, cause the emitted optical signal energy to approach a steady-state output value, and disturb the emitted optical signal energy upon a transition in the received optical signal energy, the optical resonator having at least one dimension, L, to cause phase alignment of the accumulated optical signal energy at one or more resonant wavelengths, the dimension, L, being within a range of 0.6 um to 180 um and having a tolerance, $\Delta L$, of one-hundredth of the one or more resonant wavelengths, or better; and
   a detector aligned with the output to detect the emitted optical signal energy and configured to detect the disturbance to the emitted optical signal energy and determine a characteristic of the transition in the received optical signal energy based upon the disturbance.

2. The optical signal receiver of claim 1 wherein the optical resonator is further configured to disturb the emitted optical output signal based upon a phase variation in the received optical signal energy.

3. The optical signal receiver of claim 1 wherein the disturbance is a temporary reduction in intensity of the emitted optical signal energy and the detector is further configured to detect the temporary reduction and to determine a phase transition in the received optical signal energy based upon the temporary reduction.

4. The optical signal receiver of claim 1 wherein the optical resonator is an etalon having two semi-reflective surfaces configured to at least partially trap the optical signal energy by reflecting a portion of optical signal energy impinging upon each of the semi-reflective surfaces.

5. The optical signal receiver of claim 1 wherein the optical resonator includes first and second reflective surfaces, substantially parallel with each other, with reflective sides facing each other, the first reflective surface forming at least a portion of the aperture and being partially transmissive to optical signal energy arriving from outside the optical resonator to allow optical signal energy into the optical resonator, the second reflective surface forming at least a portion of the output and being substantially reflective but partially transmissive to optical signal energy inside the optical resonator to allow the portion of the optical signal energy inside the optical resonator to be emitted outside the optical resonator.

6. The optical signal receiver of claim 1 wherein the transition in the received optical signal energy is an edge of a pulse and the detector is configured to determine a pulse width based upon the disturbance to the emitted optical signal energy.

7. The optical signal receiver of claim 1 further comprising an optical-electrical converter configured to convert the emitted optical signal energy into an electrical signal, the electrical signal having an amplitude indicative of an intensity of the emitted optical signal energy, and the detector configured to detect the disturbance to the emitted optical signal energy by processing the electrical signal.

8. A method of detecting information encoded in an optical signal, the method comprising:
receiving optical signal energy;
accumulating the optical signal energy in an optical resonator by partially reflecting the optical signal energy between two semi-reflective surfaces separated by a dimension, L, being within a range of 0.6 um to 180 um and having a tolerance, $\Delta L$, of one-hundredth of a resonant wavelength or better, and that approaches a steady state of accumulated optical signal energy;
outputting optical signal energy from the accumulated optical signal energy, the intensity of the output optical signal energy proportional to the accumulated optical signal energy;
detecting the output optical signal energy; and
determining a modulation characteristic of the received optical signal energy based on the detected output optical signal energy.

9. The method of claim 8 wherein determining a modulation characteristic of the received optical signal energy based on the detected output signal energy includes determining a phase variation in the received optical signal energy based on an intensity variation in the output optical signal energy.

10. The method of claim 8 further comprising reducing the accumulated optical signal energy in the optical resonator by destructive interference within the optical resonator in response to the modulation characteristic of the received optical signal energy.

11. The method of claim 10 wherein the modulation characteristic of the received optical signal energy is a phase transition associated with a phase modulation produced at a transmitter.

12. The method of claim 8 further comprising converting the output optical signal energy into an electrical signal, the amplitude of the electrical signal being representative of the intensity of the output optical signal energy.

13. The method of claim 12 wherein determining a modulation characteristic of the received optical signal energy based on the detected output optical signal energy includes providing the electrical signal to a receiver.

14. An optical receiver comprising:
an etalon configured to at least partially accumulate optical signal energy between two semi-reflective surfaces having a resonant dimension within a range of 0.6 um to 180 um and a tolerance of one-hundredth of a resonant wavelength or better, and having an aperture to allow optical signal energy to enter and an output to allow a portion of the accumulated optical signal energy to be emitted, the etalon configured to cause the output optical signal energy to temporarily vary in intensity based upon a phase transition in the entering optical signal energy;
an optical-electrical converter configured to receive the output optical signal energy and to convert the output optical signal energy into an electrical signal; and
a receiver configured to receive the electrical signal and to determine data based in part on the electrical signal.

15. The optical receiver of claim 14 further comprising an analog to digital converter configured to convert the electrical signal from an analog form to a digital form, the receiver configured to receive the digital form of the electrical signal.

16. The optical receiver of claim 14 wherein the receiver is further configured to correlate the electrical signal with at least one of a spreading code, a pseudo-random code, a block code, and a convolution code.

17. The optical receiver of claim 14 wherein the etalon is configured to have a nominal dimension selected to cause the accumulation of optical signal energy to occur at a particular rate to accommodate an expected data rate associated with the data.

18. The optical receiver of claim 14 further comprising optics configured to collect optical signal energy and provide the optical signal energy to the etalon.

* * * * *